United States Patent [19]
Gail

[11] Patent Number: 5,745,069
[45] Date of Patent: Apr. 28, 1998

[54] REDUCTION OF RADAR ANTENNA AREA

[75] Inventor: William B. Gail, Boulder, Colo.

[73] Assignee: Ball Corporation, Muncie, Ind.

[21] Appl. No.: 710,092

[22] Filed: Sep. 10, 1996

[51] Int. Cl.⁶ .................................................. G01S 13/90
[52] U.S. Cl. ........................... 342/25; 342/162; 342/196
[58] Field of Search ........................... 342/25, 162, 189, 342/192, 194, 195, 196, 197

[56] References Cited

U.S. PATENT DOCUMENTS

| | | | |
|---|---|---|---|
| 3,993,994 | 11/1976 | Goggins | 343/5 |
| 4,309,703 | 1/1982 | Blahut | 342/201 |
| 4,616,227 | 10/1986 | Homma et al. | 342/25 |
| 4,706,089 | 11/1987 | Weindling | 342/25 |
| 4,727,373 | 2/1988 | Hoover | 342/25 |
| 4,794,395 | 12/1988 | Cindrich et al. | 342/424 |
| 4,853,699 | 8/1989 | Easton | 342/25 |
| 4,975,704 | 12/1990 | Gabriel et al. | 342/25 |
| 5,051,749 | 9/1991 | Stoyle | 342/25 |
| 5,070,337 | 12/1991 | Chen et al. | 342/201 |
| 5,093,649 | 3/1992 | Johnson | 342/157 |
| 5,307,070 | 4/1994 | Runge et al. | 342/25 |
| 5,323,162 | 6/1994 | Fujisaka et al. | 342/25 |
| 5,343,204 | 8/1994 | Farmer et al. | 342/25 |
| 5,396,250 | 3/1995 | Tsui et al. | 342/13 |
| 5,424,742 | 6/1995 | Long et al. | 342/25 |
| 5,430,445 | 7/1995 | Peregrim | 342/25 |
| 5,442,359 | 8/1995 | Rubin | 342/109 |
| 5,455,593 | 10/1995 | Ross | 342/375 |
| 5,463,397 | 10/1995 | Frankot | 342/25 |
| 5,489,907 | 2/1996 | Zink et al. | 342/25 |

OTHER PUBLICATIONS

Chapter 32, "SAR Design Considerations and Operating Modes", in *High Resolution Ground Mapping*, pp. 551–562.
Chapter 31, "Principles of Synthetic Array Radar", in *High Resolution Ground Mapping*, pp. 527–548.
Curlander et al., "Synthetic Aperture Radar Systems and Signal Processing", in *Wiley Series in Remote Sensing*, Jin Au Kong, ed., John Wiley & Sons, Inc., New York, pp. 348–369.
Elachi et al., *Proc. IEEE*, 1982, 70(10):1174–1209.
Freeman, *IEEE Trans. Geosci. Remote Sensing*, 1992, 30(6):1107–21.
Freeman et al., *IEEE Trans. Gioscience Remote Sensing*, 1992, 30(3):531–39.
Freeman, Draft of "SIR–C Calibration Processor Algorithm Specification Document", Jet Propulsion Laboratory Document No. JPL D–10059.

*Primary Examiner*—John B. Sotomayor
*Attorney, Agent, or Firm*—Sheridan Ross P.C.

[57] ABSTRACT

The traditional minimum antenna area limit for synthetic aperture radar (SAR), imposed by ambiguity considerations, is eliminated by using a transmitter format providing distinguishable sub-pulses. Signal formats which are feasible for implementing such sub-pulses include frequency-division (i.e., a distinct frequency band is used for each sub-pulse), and code-division (i.e., sub-pulses occupying the same frequency band are grouped in distinguishable combinations). The nominal pulse period is divided into N sub-pulses, and the sub-pulse group is transmitted with the nominal pulse repetition frequency ($f_p$). The range ambiguities are determined by the repetition rate of the sub-pulse group ($f_p$) and the azimuth ambiguities are determined by the repetition rate of the sub-pulses ($N.f_p$). The antenna is capable of sampling a Doppler bandwidth that is a factor of N times the traditional value and the antenna area can be reduced by a factor N from the limiting value presently used in SAR antenna design. A reduction in antenna length by a factor of N, for example, can be obtained at the expense of a signal-to-noise decrease of N and an increase in signal bandwidth by the same factor. Alternatively, the same antenna length reduction of N and an increase in signal-to-noise by a factor N can be obtained using the original bandwidth if the resolution is degraded by N.

36 Claims, 11 Drawing Sheets

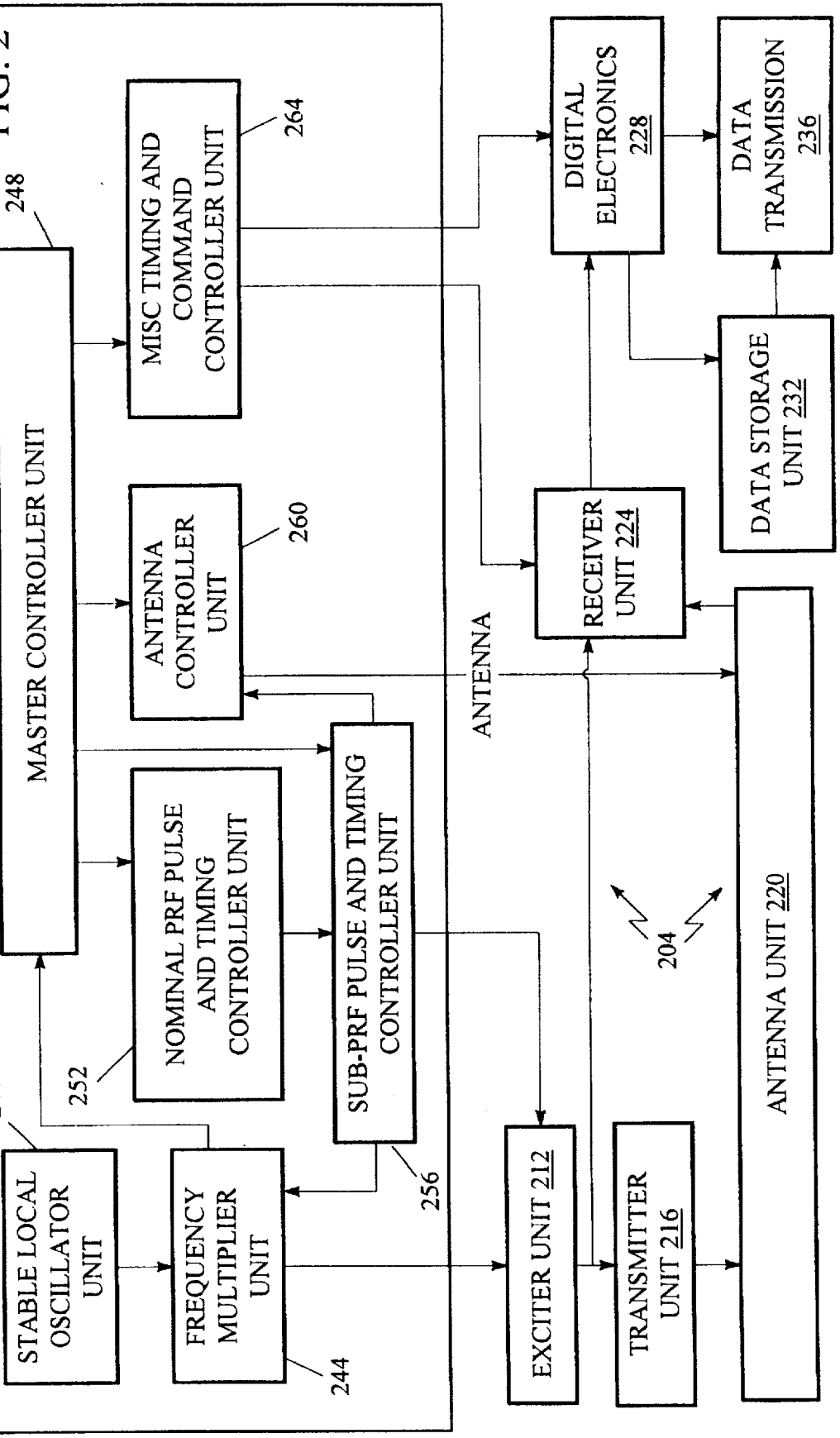

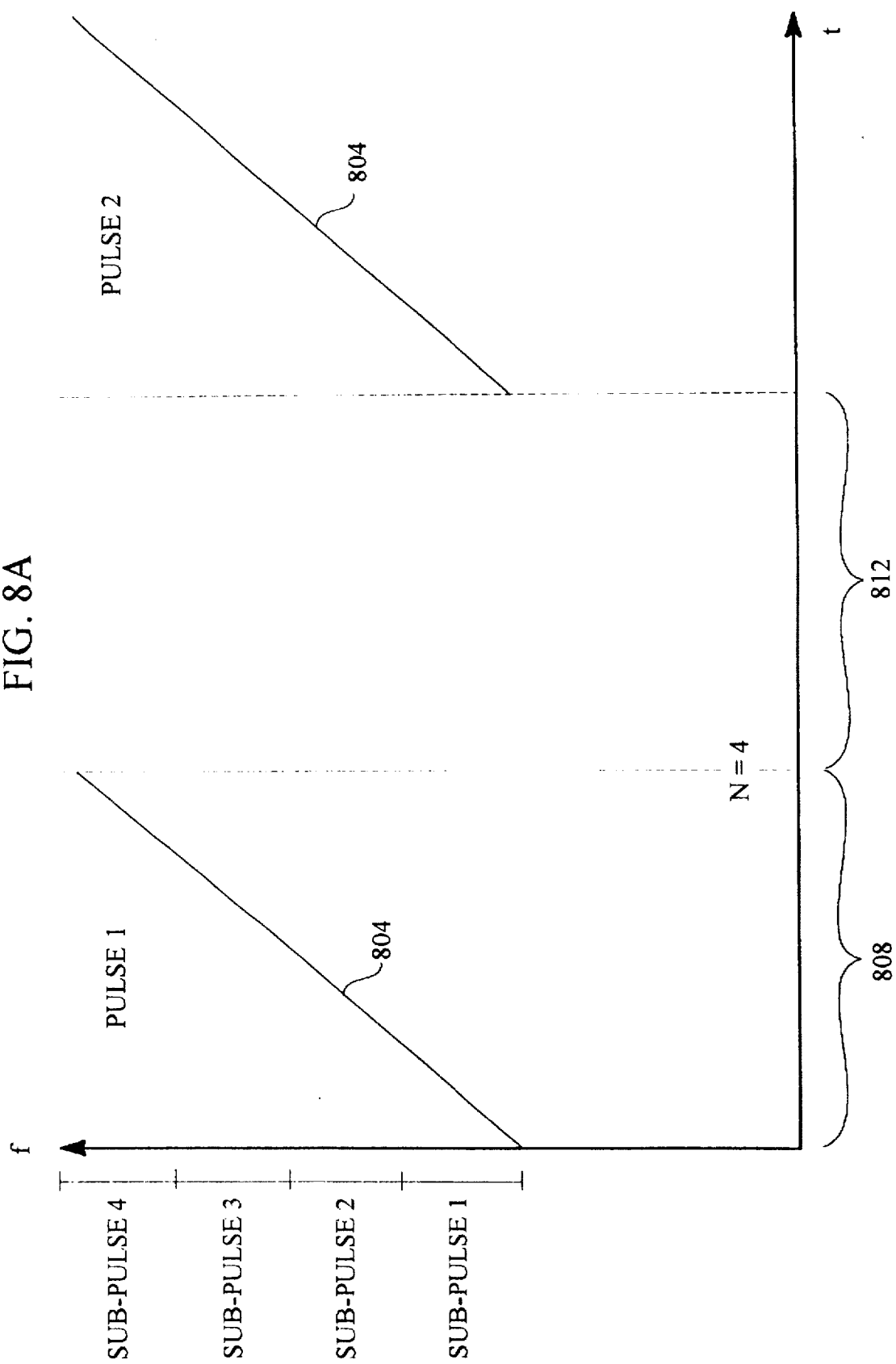

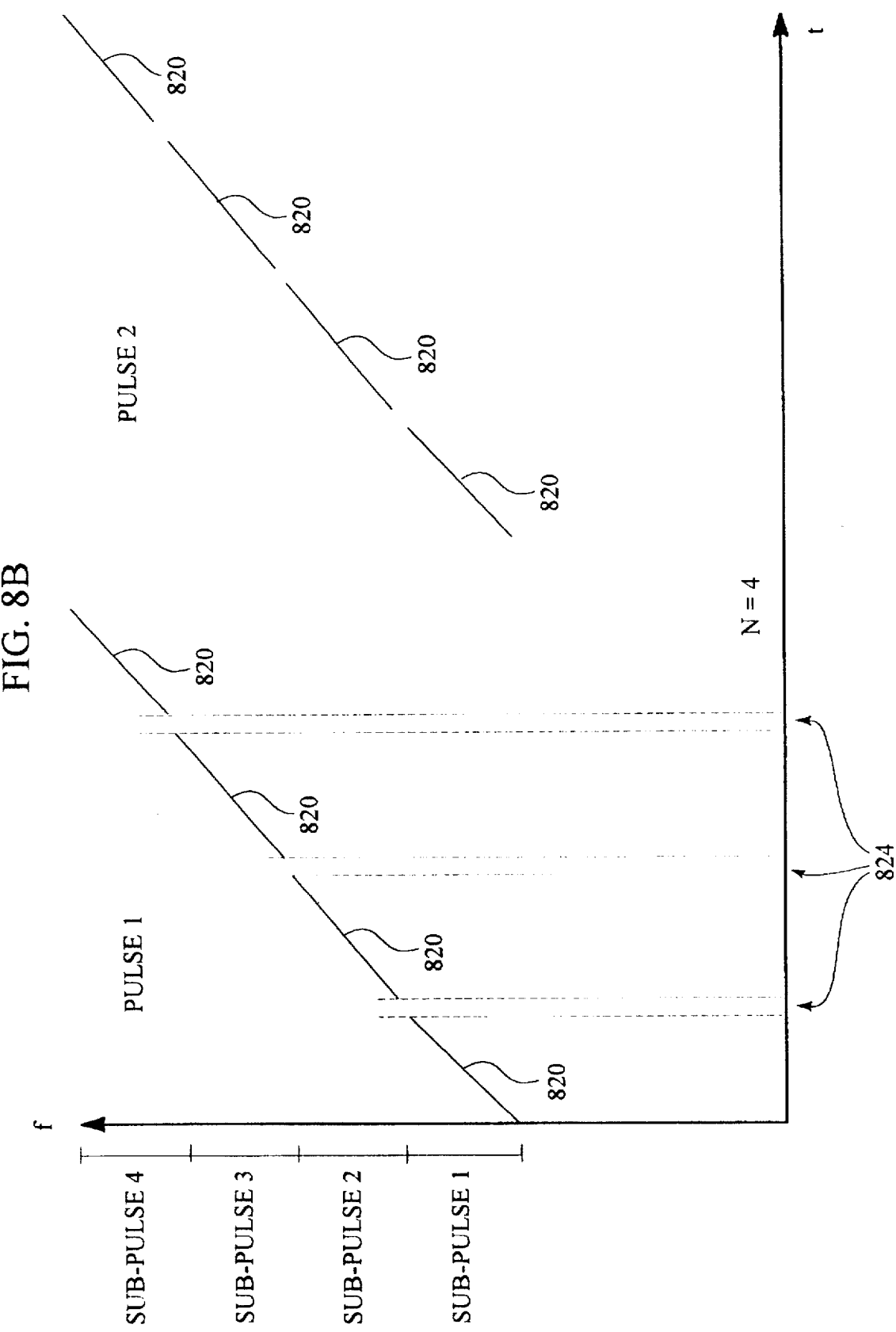

REDUCTION OF RADAR ANTENNA AREA

FIELD OF THE INVENTION

The present invention relates to a radar signal pulse protocol and signal processing system allowing a reduction in the size of an antenna; the present invention is particularly useful for space based synthetic aperture radar systems.

BACKGROUND OF THE INVENTION

In traditional methods of synthetic aperture radar (SAR) imaging, imaging is performed by processing several radar signal pulses reflected along the length of a single determined swath or band of terrain. In particular, each radar pulse is typically reflected from a distinct terrain area, denoted a "footprint," wherein a series of overlapping footprints are used in determining an image for some portion of a swath. The aperture area (hereinafter, also simply denoted as "area") of a synthetic aperture radar (SAR) antenna is conventionally determined by at least one of the constraints:

(1.1) the gain required to achieve a desired sensitivity, and (1.2) the theoretical minimum area required to reduce signal reflection ambiguities to acceptable levels. For some SAR systems, the second constraint leads to larger antennas than may be required by gain considerations of constraint (1.1) alone. At L-band, for example, a typical orbiting SAR system on a platform operating at 700 km altitude and designed to image the earth at a 55° incidence angle heretofore required a minimum antenna area of approximately 50 m². Such a large antenna becomes a strong design driver for a transporting spacecraft from a mass and volume standpoint and additionally requires complex procedures for deployment of such a large antenna.

When imaging, for example, the earth from an orbiting platform, the ambiguity-driven theoretical minimum area constraint (1.2) above arises from the desire to reduce the ambiguities in the reception of reflected radar transmissions simultaneously in both: (a) the directions substantially perpendicular to the trajectory of the orbiting SAR platform (these directions denoted hereinafter the "range" dimension), as well as, (b) the directions substantially coincident or parallel with the trajectory of the platform (these directions denoted hereinafter the "azimuth" dimension). In the range dimension, the maximal distance along the surface where a radar signal is reflected is denoted the "elevation beamwidth ground projection." For unambiguous reception of reflected signals in the range dimension, a range ambiguity constraint exists wherein the elevation beamwidth ground projection must be sufficiently small so that a reflected signal pulse from any portion of the illuminated footprint is not received simultaneous with the reflected signal associated with a different pulse. In the azimuth dimension, the maximal distance along the surface where a radar signal is reflected (i.e., the footprint) is denoted the "azimuth beamwidth ground projection." For unambiguous reception of reflected radar signals in the azimuth dimension, an azimuth ambiguity constraint exists wherein the azimuth beamwidth for the SAR antenna must be sufficiently small that the Doppler bandwidth of a received reflected signal can be properly sampled at the pulse repetition frequency (PRF) of the radar. Accordingly, the range ambiguity constraint imposes an upper limit on the PRF while the azimuth ambiguity constraint imposes a lower limit. Consequently, assuming the pulse sampling rates are substantially the same in the azimuth and range directions, equating the corresponding two limits leads to the standard ambiguity theoretical constraint on the minimum value for the area of the antenna, as described, for example, in (a) Elachi, C., T. Bicknell, R. L. Jordan, and C. Wu (1982) Spaceborne Synthetic-Aperture Imaging Radars: Applications, Techniques, and Technology. *Proc. IEEE*, 70, (Oct. 1982), 1174–1209; (b) Curlander, J. C., and R. N. McDonough (1992) *Synthetic Aperture Radar*, John Wiley and Sons, New York, 1991, 154–171; and (c) Harger, R. O. (1970) *Synthetic Aperture Radar Systems*, Academic Press, New York, 1970, these publications being incorporated herein by reference. Accordingly, when transmitting and processing radar signals in accordance with the assumptions for the standard ambiguity theoretical constraint, an antenna area smaller than the minimum theoretical value for a SAR system has heretofore resulted in ambiguities in detecting reflections of radar transmissions wherein such ambiguities produce unacceptable distortions or noise in resulting images. Moreover, as one skilled in the art will understand, this theoretical minimum antenna area is proportional to $\sin\theta/\cos^2\theta$, where $\theta$ is the incidence angle of a swath being illuminated by the radar transmissions. Thus, increasingly larger antennas are required as the incidence angle between the antenna and the swath increases toward 90°. Thus, the antenna minimum area constraint becomes particularly problematic for radars designed to image at large incidence angles.

Accordingly, it would be advantageous to have a method and system for relaxing or mitigating the theoretical antenna minimum area constraint without generating unacceptable signal ambiguity as described above.

SUMMARY OF THE INVENTION

The present invention is a method and apparatus for allowing the minimum antenna area constraint to be offset or relaxed by: (a) transmitting signals with a novel format and (b) processing the reflections of the transmitted signals differently from conventional SAR signal processing systems. The present invention partitions a fundamental radar pulse period (herein also denoted the "fundamental period" and/or the "pulse interval") into N sub-pulse intervals with each such sub-pulse interval transmitting a signal whose reflection is distinguishable from the transmitted signals in the other sub-pulse intervals of the fundamental period. Such partitioning by the present invention effectively increases the PRF of the radar along the azimuth dimension. However, since the sub-pulses are also provided in a manner making at least one such sub-pulse reflection in each fundamental period distinguishable from sub-pulse reflections in other fundamental periods, the range ambiguity constraint is still determined by the fundamental pulse period rather than the sub-pulse period. Thus, use of sub-pulses in this manner provides for a reduction in the antenna area below that of the standard minimum theoretical antenna area constraint. In fact, by using N sub-pulses in each fundamental period, a reduction in antenna area by a factor of N is achievable while providing images of acceptable quality.

Accordingly, the present invention may be utilized for generating and processing data derived from such sub-pulse reflections when these reflections are received by a SAR sensor system residing on, for example, a satellite or platform orbiting the earth. In particular, the derived data is typically generated on board the satellite or platform and subsequently transferred to a ground based SAR processing system for performing sampling and ambiguity reduction on the derived data. Accordingly, it is an aspect of the present invention for the SAR processing system (or any other system with similar functionality) to sample the derived data from (and ordered according to the reception of) each sub-pulse reflection at two different sampling rates in order to reduce signal reception ambiguity in the derived data. That is, the derived data is sampled at a first sample rate that is at least as frequent as frequent as a first repetition frequency determined for reducing ambiguity along the direction of the trajectory of the platform due, substantially, to Doppler bandwidth increases in the sub-pulse reflections. Additionally, the derived data is sampled at a second rate that is less than the first repetition frequency for reducing ambiguity, wherein this second rate is utilized to reduce ambiguity in the derived data resulting from an extended time over which a sub-pulse reflection may be detected in the direction traverse to the trajectory of the platform (i.e., the range direction). More particularly, the second sampling rate is no greater than the repetition frequency of the fundamental period or pulse interval. Accordingly, in one embodiment of the present invention, the first derived data sampling rate is the sub-pulse repetition frequency and the second derived data sampling rate is the repetition frequency for the fundamental period or the pulse interval.

In one embodiment of the present invention, the sub-pulses within a fundamental period are orthogonal to one another in that each sub-pulse signal transmission is within a bandwidth not overlapping the transmission bandwidth of any other sub-pulse within the fundamental period. In particular, for linear FM (chirp) radars, the radar bandwidth is increased by N (beyond that required to achieve the desired range resolution) and N sub-chirps are generated in each fundamental period wherein each sub-chirp is offset in center frequency from the other sub-chirps. The result of this sub-pulse partitioning technique is a SAR imaging system with an antenna considerably smaller than heretofore allowed.

Other features and benefits of the present invention will become apparent from the detailed description with the accompanying figures contained herein.

BRIEF DESCRIPTION OF THE DRAWINGS

FIG. 2 presents a block diagram of the SAR sensor system 204 used for transmitting and receiving radar signals according to the present invention from a platform above the area about which data is being collected;

FIG. 8A presents an implementation of a linear FM sub-pulse format for the present invention wherein the sub-pulses are continuous;

FIG. 8B presents an implementation of a linear FM sub-pulse format for the present invention wherein the sub-pulses are separated;

DETAILED DESCRIPTION

Figure 1:
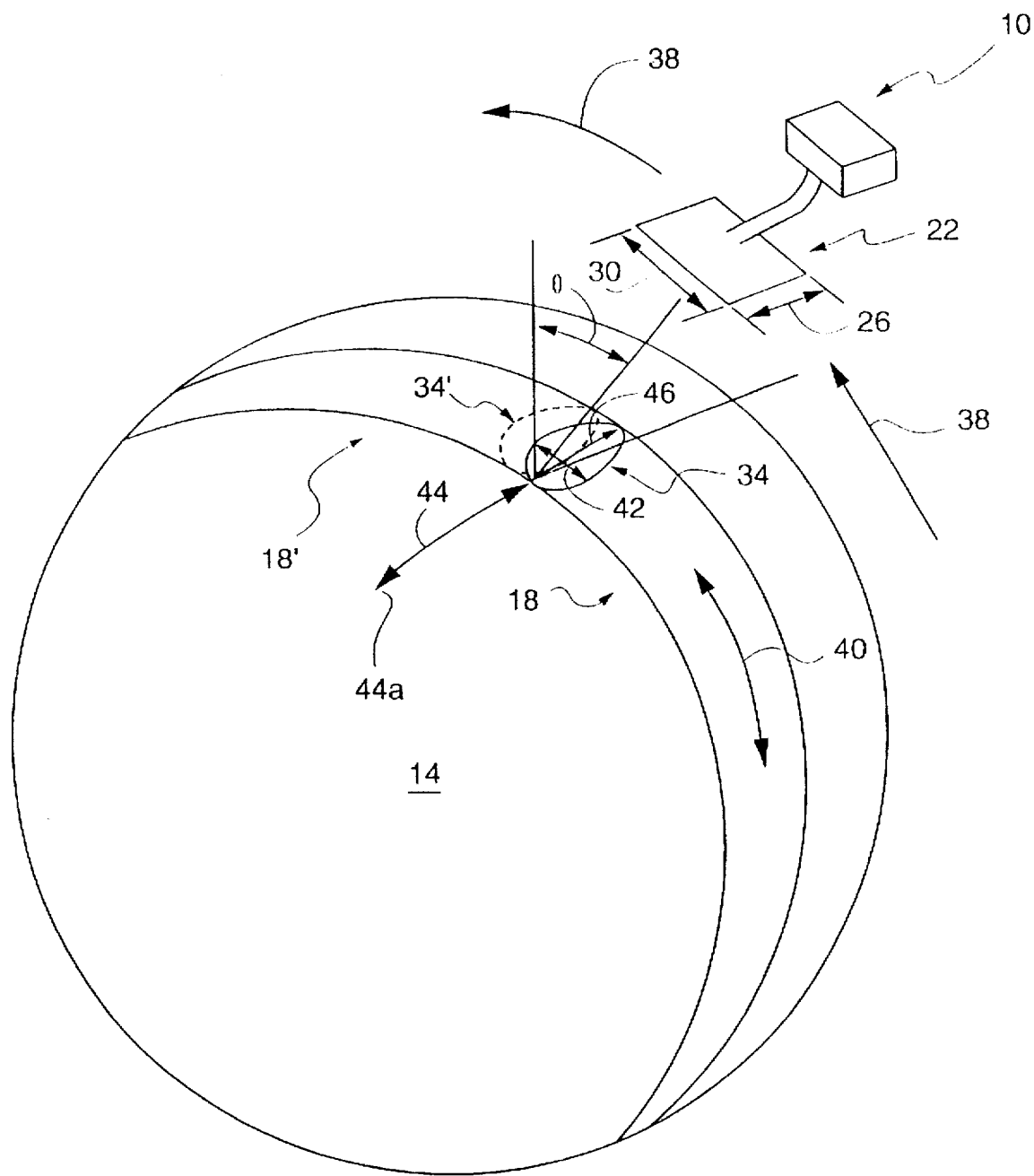
FIG. 1 shows a satellite 10 having an antenna 22 for imaging a swath 18 of a body 14.

FIG. 1 illustrates a platform or satellite 10 traveling above a body 14 such as the earth and imaging the body along the swath 18 using, for instance, synthetic aperture radar (SAR). That is, the platform 10 transmits pulsed radar signals toward the swath 18 and detects reflections of the transmitted signals thereby generating data relating geographical areas to detected signal values (e.g., such reflected signal values being complex voltage values corresponding to the complex amplitude of the reflected electromagnetic signals and denoted for an entire geographical area as a "radar cross section amplitude"). Accordingly, particular characteristics of the geographical areas may be determined or imaged using such detected signal values. In particular, the following, characteristics for example, may be determined: positions of natural and/or artificial objects such as roads and buildings, soil moisture, vegetation type, mineral type, ice/snow cover, topographical characteristics of an area, ocean surface and sub-surface features.

The platform 10 includes an antenna 22 having a width 26 and a length 30 for transmitting the radar signals and receiving the reflected radar images of the swath 18. That is, the platform 10 detects reflected signals of a single footprint 34 at a time by transmitting one or more radar pulses toward the footprint. Accordingly, as the platform 10 travels above the body 14 in the direction of arrows 38, reflected signals from overlapping footprints (e.g., 34 and 34') are received as the radar pulses generated by the platform are directed toward successive footprints along swath 18 in the direction of arrows 38.

It is important to note that the beamwidth 42 (i.e., the angular dimension of the widest portion of a footprint in the directions of the double-headed arrow 40, and known as the "azimuth beamwidth" in the art) varies inversely with the length 30 of the antenna 22. Thus, as the length 30 increases, the beamwidth 42 decreases and vice versa. Further, as the beamwidth 42 increases, spectrum Doppler shift effects become increasingly more pronounced, thereby increasing the spectrum of Doppler bandwidth of the reflected signals received by the platform 10. Moreover, it is well-known that for reliable signal detection the signal sampling rate (i.e., equivalently, the PRF) must be greater than the received Doppler signal bandwidth to avoid bandwidth aliasing and thus unambiguously detect the received signals. Thus, the platform 10 is subject to a constraint (the aforementioned azimuth ambiguity constraint) wherein, to obtain substantially unambiguous reflected signal detection in the azimuth dimension (i.e., in the direction of double headed arrow 40), the length 30 of the antenna 22 is directly related to the pulse repetition frequency (PRF) which has a lower bound of acceptable values. Accordingly, the antenna length 30 is typically increased when other constraints lead to selection of a PRF which is less than this lower bound.

As the incidence angle θ between the antenna 22 and the footprint 34 being imaged increases, the swath 18 shifts perpendicularly to the double-headed arrow 40 (in the direction of arrow 44a) further away from directly below the platform 10. Accordingly, the width 46 of the swath (i.e., the longest portion of footprints 34) , and the footprints 34 therein, increase. Thus, due to the increase in the difference in the signal travel time between the nearest portion of a footprint 34 and the furthest portion (in the range dimension), the PRF must be reduced or the swath 18 must have a smaller swath width 46 to avoid signal ambiguity resulting from reflected signals overlapping from different radar pulse intervals. Thus, the platform 10 is subject to a constraint (the aforementioned range ambiguity constraint) wherein to obtain substantially unambiguous reflected signal detection in the range directions (i.e., in the directions of double-headed arrow 44), the width 26 of the antenna 22 is directly related to PRF. Typically, this has meant an increase in antenna width 26 to thereby decrease the swath width 46 since the above-mentioned azimuth constraint specifies a lower bound on the PRF.

Thus, in a conventional design of a platform 10, either or both the width 26 and the length 30 of an antenna 22 may be unacceptably small in order to unambiguously detect reflected signals in both the range and azimuth dimensions.

Mathematically, the relationships between the range and azimuth ambiguity constraints on the PRF in relation to the antenna dimensions may be described as follows. For an antenna 22, ambiguous range main lobe responses can be minimized by selecting the PRF such that $$f_p < \frac{fW\cos^2\theta}{2h\beta_w\sin\theta} \quad [1.1]$$

where $f_p$ is the PRF, $f$ is the carrier frequency of the transmitted pulse, W is the antenna width 26, h is the satellite 10 altitude, $\beta_w$ is a factor that accounts for beam broadening, and $\theta$ is the incidence angle. Note that a flat earth is assumed for this simple analysis. Similarly, unambiguous azimuth responses can be minimized by selecting the PRF such that $$f_p > \frac{2v\beta_L}{L} \quad [1.2]$$

where v is the satellite 10 speed, $\beta_L$ accounts for beam broadening, and L is the antenna length 30. Equating these limits leads to the standard constraint on antenna area given by $$\text{antenna area} = W \cdot L > \frac{4vh\beta_w\beta_L\sin\theta}{f\cos^2\theta} \quad [1.3]$$

Accordingly, note that equation [1.3] is the equation that should be modified to account for such practicalities as earth curvature.

Relaxed Minimum Area Constraint

For mathematically describing the present invention, consider a transmitted signal S(t) which is the sum of N sub-pulses $s_i(t)$, defined by $$S(t) = \sum_{i=1}^{N} s_i(t) \quad [1.4]$$

with the ideal orthogonality property $$\int_{-\infty}^{\infty} s_i^*(t'-t)s_j(t')dt' = \delta_{ij} \cdot I_i(t) \quad [1.5]$$

where $\delta_{ij}$ is the Kronecker delta and $I_i(t)$ is the impulse response corresponding to $S_i$. The impulse response of a pulse-compression radar using transmitted signals of this form is $$g(t) = A \int_{-\infty}^{\infty} S_T^*(t'-t)S_R(t'-\tau)dt' \quad [1.6]$$

where A is a complex scale factor, $S_R(t)$ is the receive signal, $S_T(t)$ is a replica of the transmitted signal S(t), and $\tau$ is the time delay between transmission and reception. If we assume that $S_R(t-\tau)=S(t-\tau)$ and choose $S_T(t)=S(t)$, this can be written in terms of the sub-pulse format as $$g(t) = A \sum_{i=1}^{N} \int_{-\infty}^{\infty} s_i^*(t'-t)s_i(t'-\tau)dt' \quad [1.7]$$

where the orthogonality property has been applied. The signal S(t) can thus be treated, for the purpose of sampling the uncompressed azimuth signal of the SAR, as an equivalent set of N independent pulses occurring within each nominal pulse period. For a SAR operating at a pulse repetition frequency of $f_p$, the effect is to increase the azimuth sampling frequency to $Nf_p$ while retaining the range ambiguity properties associated with a pulse repetition rate of $f_p$. The particular representation of the delay time $\tau$, which depends on the processor implementation, does not affect the analysis.

Accordingly, the N samples repeated every pulse period represent a sampling of the azimuth waveform with an equivalent PRF $\hat{f}_p$ given by $$\hat{f}_p = Nf_p \quad [1.8]$$

where $f_p$ is called the fundamental PRF. The azimuth ambiguity equation can now be modified assuming this change to the sampling process, giving $$\hat{f}_p > \frac{2v}{NL}\beta_1 \quad [1.9]$$

and leading to a modified form of the minimum area constraint given by $$\text{Antenna Area} > \frac{4vh\beta_w\beta_1\sin\theta}{Nf\cos^2\theta} \quad [1.10]$$

By processing the received signal in the manner described above, it is thus possible to perform SAR imaging using an antenna 22 significantly smaller than the minimum size imposed by traditional theory.

The present invention can be utilized with various waveform division techniques. For example, both frequency-division and code-division waveforms can be used to implement the sub-pulse technique. The effectiveness of the selected waveform division technique may be evaluated by determining the degree to which it satisfies the orthogonality condition embodied in equation [1.5].

In one embodiment of the present invention for a frequency-division system, the sub-pulses have no common frequency components. As a consequence, the range resolution following range correlation corresponds to the sub-pulse bandwidths. If, for example, the total bandwidth B is divided equally among N sub-pulses, the range resolution following range resolution is N times as large as a SAR employing the full bandwidth B without sub-pulses due to the fact that each sub-pulse has a bandwidth given by B/N. As discussed in subsequent sections, this resolution reduction can be recovered during the azimuth correlation processing.

In an alternative embodiment for a code-division system, even though common frequency components exist, the orthogonality can be achieved by choosing waveforms for the pulses (i.e., codes) that minimize the orthogonality integral of equation [1.5], as one skilled in the art will appreciate. Note, however, that while this approach can be used to maintain the original bandwidth (and thus range resolution), the trade-off is an increase in noise power in the processed signal due to the presence of non-orthogonal signals.

It is important to note that the present invention allows for the reduction in minimum antenna area through a decrease in antenna length, antenna width, or some combination of length and width. However, since the sub-pulse approach does not modify the fundamental PRF, range ambiguities are unaffected by the sub-pulse format. Consequently, the antenna width 26 can only be reduced if the range dimension was already oversampled or if the fundamental PRF is reduced. The range resolution is larger by the ratio of the original bandwidth to the sub-pulse bandwidth. The antenna length 30, however, can be reduced by an amount consistent with a beamwidth that produces a Doppler bandwidth that is properly sampled at the total PRF. In general, such an increase in Doppler bandwidth corresponds to a comparable improvement in azimuth resolution. For example, doubling the Doppler bandwidth of the reflected signals allows the azimuth resolution to be smaller by a factor of two. A typical processor will compensate for the resolution change by processing multiple azimuth samples to achieve an azimuth resolution matched to the range resolution. Alternatively, the additional samples can be used to reduce speckle (i.e., a reduction in the statistical variation in measurements of the signal reflection through multi-look processing where several samples are averaged to obtain a single value for the reflected signal measurement).

In some embodiments of the present invention, the sub-pulse format could potentially create range ambiguities in a fundamental pulse interval due to time or frequency side-lobes from the other sub-pulses. However, these ambiguities can be minimized by one or more of the following: (a) increasing the sub-pulse length; (b) weighting or coding the pulses; and/or (c) including gaps between sub-pulse bands.

A SAR image processing system utilizing the present invention includes two subsystems:

(2.1) a SAR sensor system, typically located on a spacecraft, aircraft, or other platform, and used for generating radar signals and receiving them after having been reflected from a body such as, for example, the body 14; and (2.2) a SAR processor system, used (a) for processing data received from the SAR sensor system, (b) for generating images of the body and (c) for generating other information which can be derived from data corresponding to signals reflected by the body and received by the SAR sensor system. Note that the SAR processor system is generally not located on the platform 10 with the SAR sensor system due to the considerable amount of computational hardware required for image processing. However, there are embodiments for which the SAR sensor system and the SAR processor system may be located on the same platform 10, as one skilled in the art would be aware of.

FIG. 2 shows a block diagram of a SAR sensor system 204 embodying the present invention. The blocks in this diagram may be implemented as distinct computational units, consisting of electronics hardware and associated software, although in some cases the functionality of a number of such computational units have been combined. The SAR sensor system 204 can be logically divided on the basis of two functions: a signal transmission function and a signal reception function. The signal transmission function includes the functionality for generating and transmitting a SAR radar signal. The signal reception function includes the functionality for receiving and storing a reflected SAR radar signal. The hardware/software units for the two functions are generally combined within a SAR sensor system on a single platform 10, using substantially different hardware/software units for the two functions but employing common hardware/software units for some purposes, as is described hereinbelow. Note, however, that in some embodiments, the transmission and reception functions are performed on separate platforms 10. In such cases, otherwise common hardware/software units are, of course, reproduced on each platform.

In the single platform embodiment of a SAR sensor system 204 shown in FIG. 2, the timing and control unit 208 provides reference signals, timing functions, and control functions for the entire SAR sensor system. The exciter unit 212 modulates and filters a reference signal. The transmitter unit 216 amplifies and filters the signal from the exciter unit 212. The antenna unit 220, which includes antenna 22, transmits the signal from the transmitter unit 224 and receives signals reflected from the body 14. The receiver unit 224 amplifies, filters and frequency shifts the signal from the antenna unit 220. The digital electronics unit 228 digitizes and processes the signal from the receiver unit 224. The data transmission unit 236 transmits data received from either the digital electronics unit 228 or the data storage unit 232. In this embodiment, the signal processing and storage is performed substantially using radio frequency(RF) and digital signal processing electronics. In alternate embodiments, some portion of the processing and storage may be performed using optical techniques.

FIG. 2 also shows a block diagram of the internal structure of the timing and control unit 208. The units within the timing and control unit 208 may be described as follows: The master controller unit 248 provides overall control for the SAR sensor 204 including control and coordination of the constituent units. The nominal PRF pulse and timing controller unit 252 generates and distributes control information concerning the fundamental pulse characteristics. The sub-PRF pulse and timing controller unit 256 uses the information generated by unit 252 and additional information from unit 208 to generate and distribute control information concerning the sub-pulse characteristics. This control information is used to control the radio frequency (RF) signal generated by the stable local oscillator unit (240) after it has been frequency multiplied in the frequency multiplier unit 244. The timing and control unit 208 also includes an antenna controller unit 260, which controls antenna functions such as beam steering angle, and a miscellaneous timing and command controller unit 264, which controls the receiver 224, digital electronics unit 228, and assorted miscellaneous functions. Note that at least one of these units internal to the timing and control unit 208 is entirely novel and unanticipated in conventional SAR timing and control units; i.e., the sub-PRF pulse and timing controller unit 256. This new unit, which may be implemented in hardware or as a software module, provides the control functions, timing, and waveform parameters necessary to generate sub-pulses with a frequency, format and timing differing from that of pulses at the nominal or conventional PRF. Determination and generation of these control and timing parameters involves algorithms fundamentally different from those used for determining nominal PRF and timing. For example, determination of the nominal PRF pulse and timing parameters depends substantially on knowledge of the radar frequency, the platform speed/altitude, the antenna dimensions, and data window timing issues. Determination of sub-PRF pulse and timing parameters depends in addition on signal orthogonality, signal-to-noise concerns, and more constrained data window timing issues such as transmit interference and nadir interference. Thus, pulse and timing calculations for both the nominal PRF and sub-PRF are required to achieve the desired radar waveform and control functions must be generated and issued at both the PRF and sub-PRF levels.

In the present invention, one or several of the units of the SAR sensor system 204 is modified to achieve the proposed improvement as compared with a SAR sensor that does not employ sub-pulses according to the present invention. In one embodiment, the antenna unit 220 is modified: (a) by reducing the antenna 22 aperture area, or (b) by introducing electronic or mechanical devices which provide for transmitting and receiving out of only some portion of the otherwise unmodified aperture. In a second embodiment, the antenna unit 220 is modified in a similar manner and the timing, duration and modulation (but not the total bandwidth of the transmitted signals) of the pulses is also modified. In particular, the pulse format may be modified to provide a pulse sequence with two distinct pulse frequencies, one being the nominal pulse frequency of a traditional SAR system and another being a higher frequency generated by introducing additional pulses ("sub-pulses") in the pulse stream. This change in the pulse format requires modification of the timing and control unit 208. In a third embodiment, the total bandwidth of the transmitted signal is also modified. This may require further modification of all units, including the transmitter unit 216 and the antenna unit 220, to accommodate the increased bandwidth and provide correct bandpass characteristics.

Figure 3A:
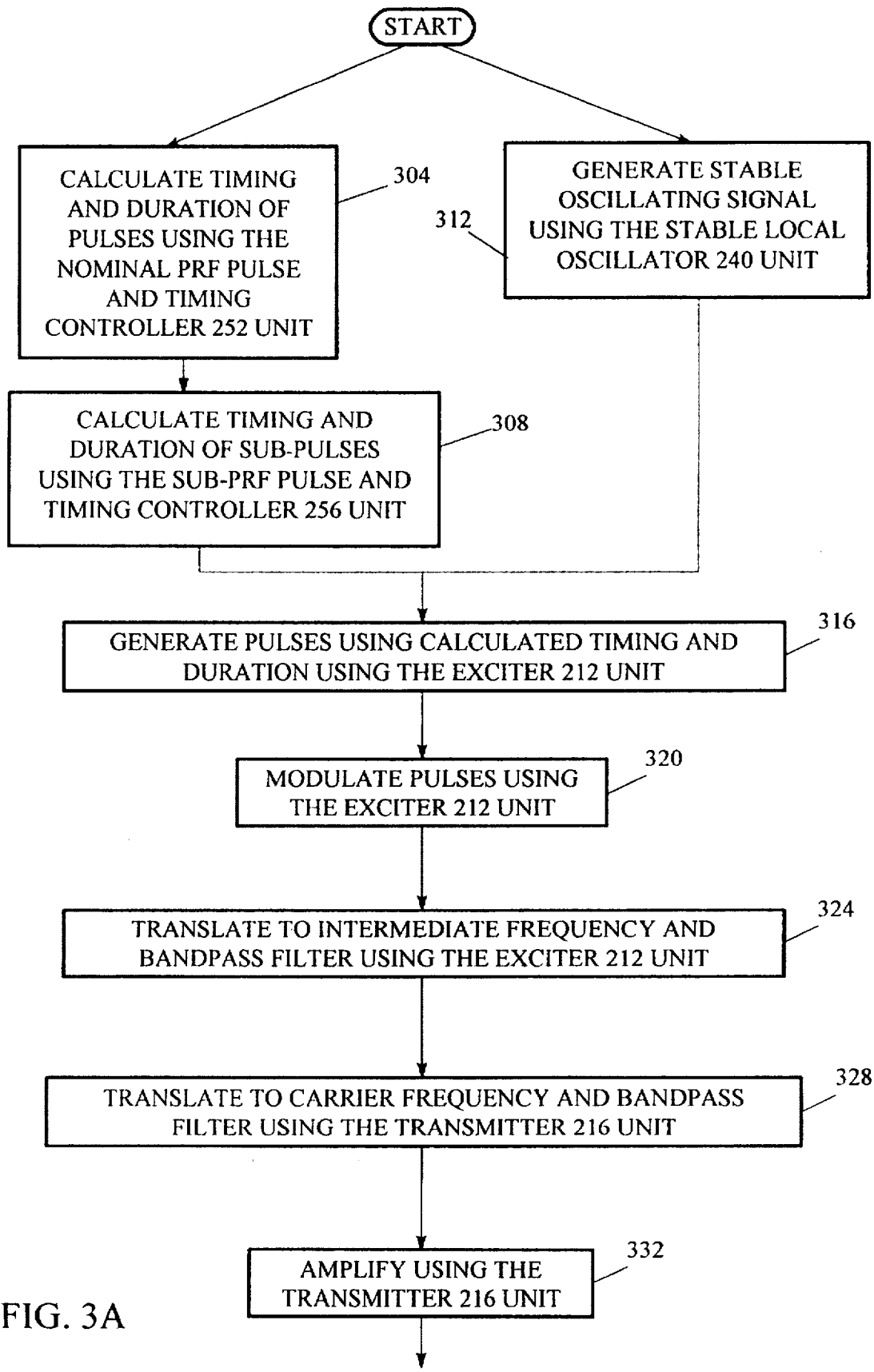
FIGS. 3A and 3B are a flowchart for the SAR sensor system 204 wherein the steps of the present flowchart describe the processing for transmitting and receiving signals according to the present invention.
Figure 3B:
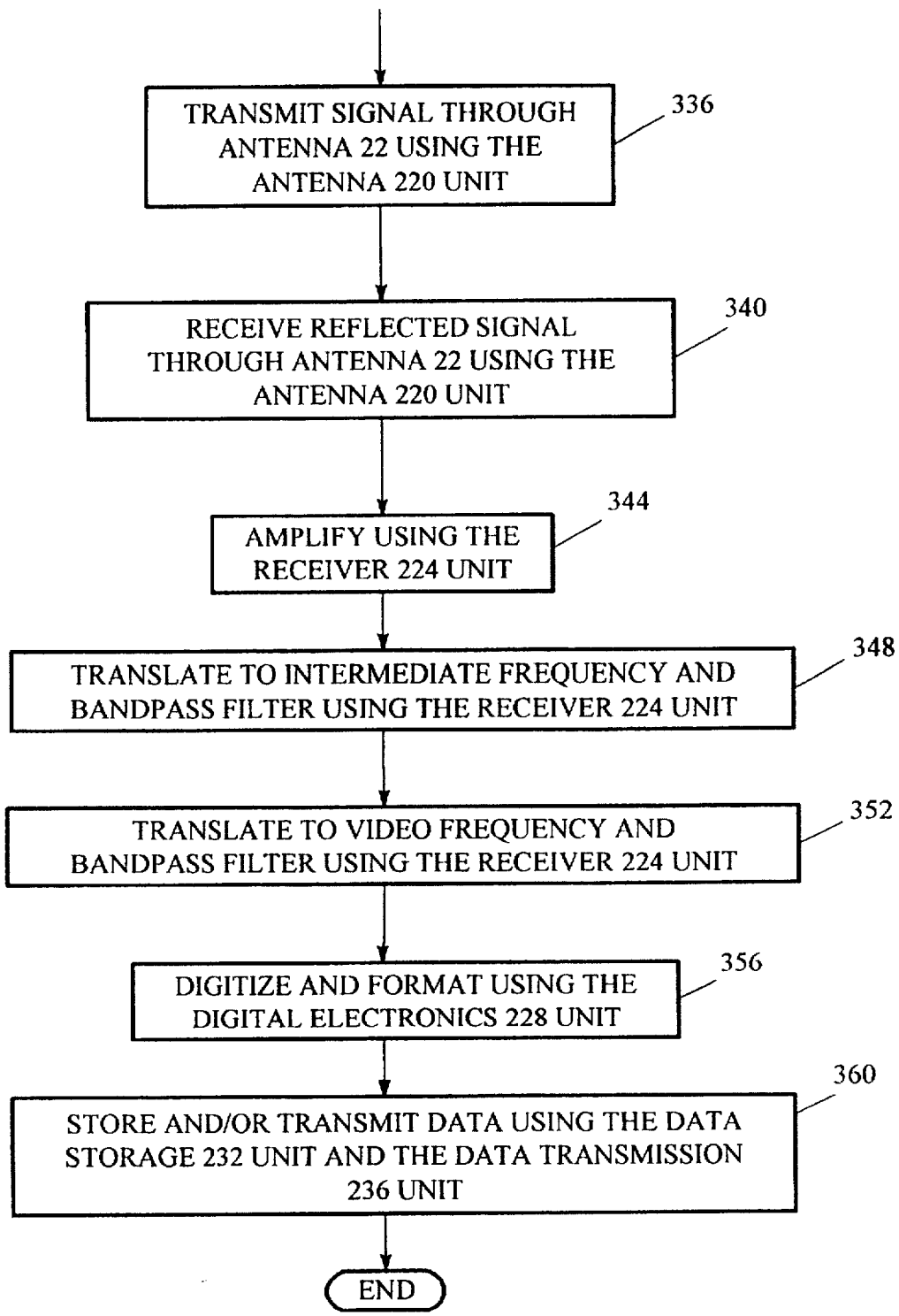

FIGS. 3A and 3B show a flow diagram of the operation of the SAR sensor system. The desired timing and duration of the radar pulses is first calculated (step 304). Subsequently, the desired timing and duration of sub-pulses is calculated (step 308). The values calculated in steps 304 and 308 are then used (step 316) to generate pulse and sub-pulse signals from the stable oscillator signal generated in step 312. These pulses and sub-pulses are then modulated (step 320), translated to an intermediate frequency and bandpass filtered (step 324), then translated to a carrier frequency and again bandpass filtered (step 328). The pulse signals are then amplified (step 332) and transmitted using the antenna 22 (step 336). The signals reflected from the body 14 are received through the antenna 22, amplified (step 344) and translated to an intermediate frequency and bandpass filtered (step 348). Subsequently, the signals are translated to a video frequency and bandpass filtered (step 352). The signals are then digitized (step 356) and processed to achieve the desired digital format, and then either stored or transmitted (step 360).

Figure 4:
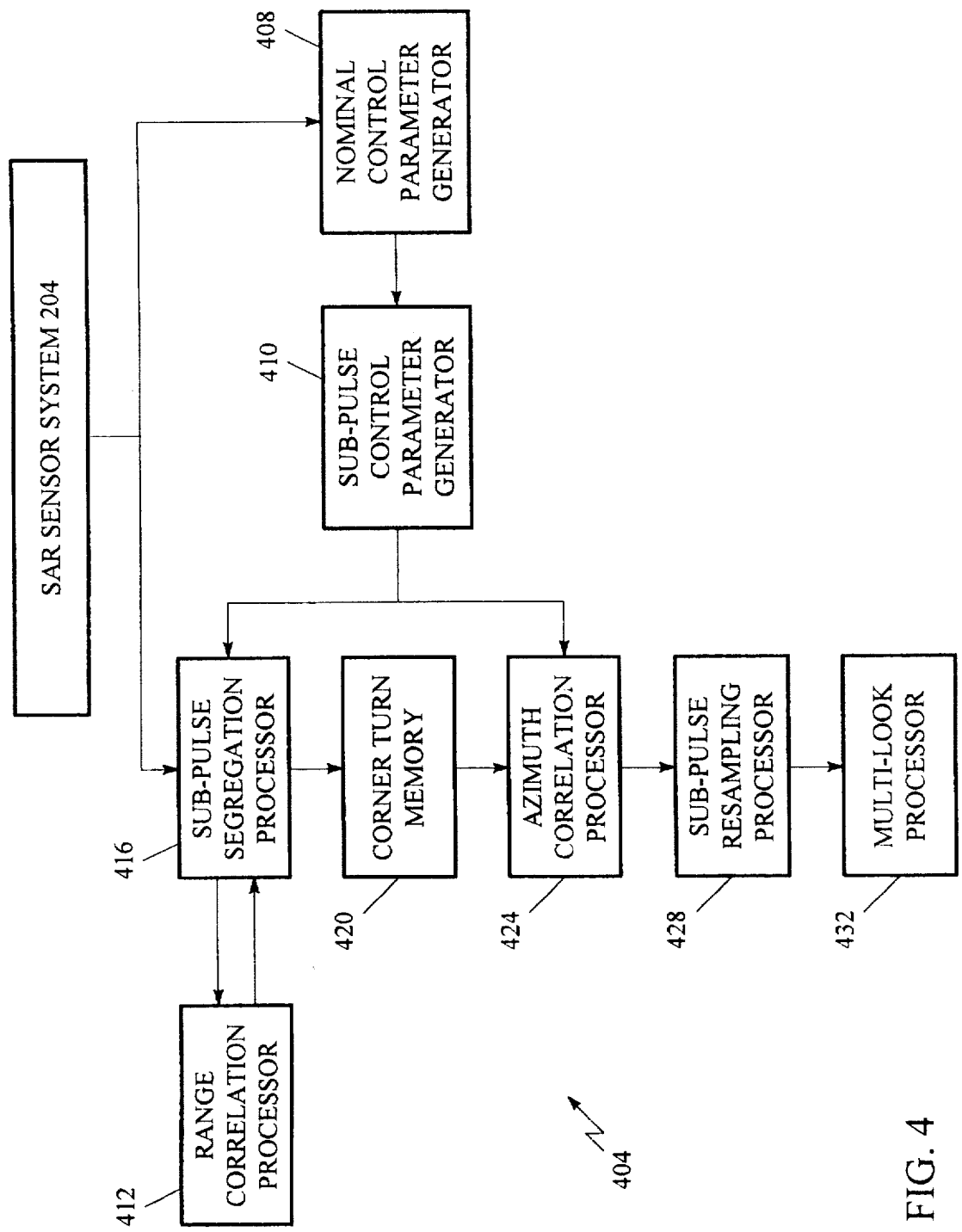
FIG. 4 is a block diagram for the present invention illustrating the architecture for a SAR processor system 404 for processing data provided by the SAR sensor system 204 into, for example, images.

FIG. 4 shows a block diagram for an embodiment of a SAR processor system 404 for the present invention. In this embodiment, the SAR processor system 404 includes digital computation devices and software which may be implemented within a single computer or using multiple computers. The nominal control parameter generator 408 uses sensor data output by the SAR sensor system 204 as well as ancillary data to calculate parameters that are used to control processing of the sensor data. The nominal control parameter generator 408 provides pulse correlation control parameters to the sub-pulse control parameter generator 410. The sub-pulse control parameter generator 410 provides the control parameters required to perform the processing at the sub-pulse level. This control information is derived from the data itself as well as from known information about the SAR sensor system and the transmitted waveforms. The sub-pulse control parameters are calculated using substantially different algorithms than those used to calculate the nominal control parameters, but incorporate parameter information generated by the nominal control parameter generator 408. For example, the following differences in algorithms are necessary: the sub-pulse control parameters must account for differences between the sub-pulses contained in each pulse sequence, such differences being typically frequency, phase, or code differences used to distinguish the sub-pulse from each other. The sub-pulse control parameters also have to account for differences in the data window, which is typically modified to accommodate the sub-pulse signals. The range correlation processor 412 employs the control parameters to perform a range correlation on the sensor data, allowing the data to be transformed or "compressed" from a large time-bandwidth product format to a nearly unity time-bandwidth product format as one skilled in the art will understand. The sub-pulse segregation process 416 iterates the range correlation procedure for each of the N sub-pulses or sub-pulse sequences within a nominal pulse period and provides appropriate frequency and phase corrections to make the sub-pulses appear substantially identical subsequent to range correlation processing. Because the reflected signals corresponding to each sub-pulse are only distinguishable by virtue of the orthogonality properties of the sub-pulse waveform, range correlation processing must be done separately for each sub-pulse. The range compressed sub-pulses are then recombined to achieve a sample of the azimuth signal with N times the sample rate associated with the fundamental PRF. Subsequently, the corner turn memory 420 stores and translates the sensor data from range processing to azimuth processing. The azimuth correlation processor 424 employs the control parameters to perform an azimuth correlation on the sensor data, allowing the data to be transformed or "compressed" using a standard technique in radar signal processing from a large time-bandwidth product to a near unity time-bandwidth product as one skilled in the art will understand. The sub-pulse resampling processor 428 corrects the two-dimensional data for resolution and geometry artifacts introduced by the use of the sub-pulse waveform. For example, it is typically necessary at this stage to coherently combine data samples in the azimuth dimension so as to match the azimuth resolution to the range resolution within the image. The multi-look processor 432 processes the two-dimensional data set generated by the previous processors to generate an image of the desired resolution and characteristics. Additionally, it is important to note that in an alternative embodiment, the SAR processor system 404 may consist substantially of optical computation devices.

Note that the present invention requires substantial modification to a conventional SAR processor system to accommodate changes to the data introduced as a result of modifications to the SAR sensor system 204. The nominal control parameter generator 408 must be modified through the addition of the sub-pulse control parameter generator 410 to provide reference functions of a different format than used in a conventional processor as a result of the changes in timing, duration, modulation and bandwidth of the transmitted signals. Both the range correlation processor 412 and the azimuth correlation processor 424 require corresponding modifications. These modifications are typically software changes that account for the differences in pulse format. In particular, sub-pulse data must be modified in an appropriate fashion within the range correlation processor 412 and the sub-pulse segregation processor 416 to generate corresponding range compressed pulses that appear to the azimuth correlation processor 424 as a substantially equivalent series of pulse samples of the azimuth signal. The azimuth correlation processor 424 must also be modified to accommodate these pulse samples which are received at a higher rate and with possibly different formats than in a standard configuration. In some embodiments, the increased azimuth beamwidth 42 of the transmitted signals, resulting from the reduction in antenna 22 aperture, also requires modification of the algorithms used to provide the azimuth correlation within the azimuth correlation processor 424.

Figure 5:
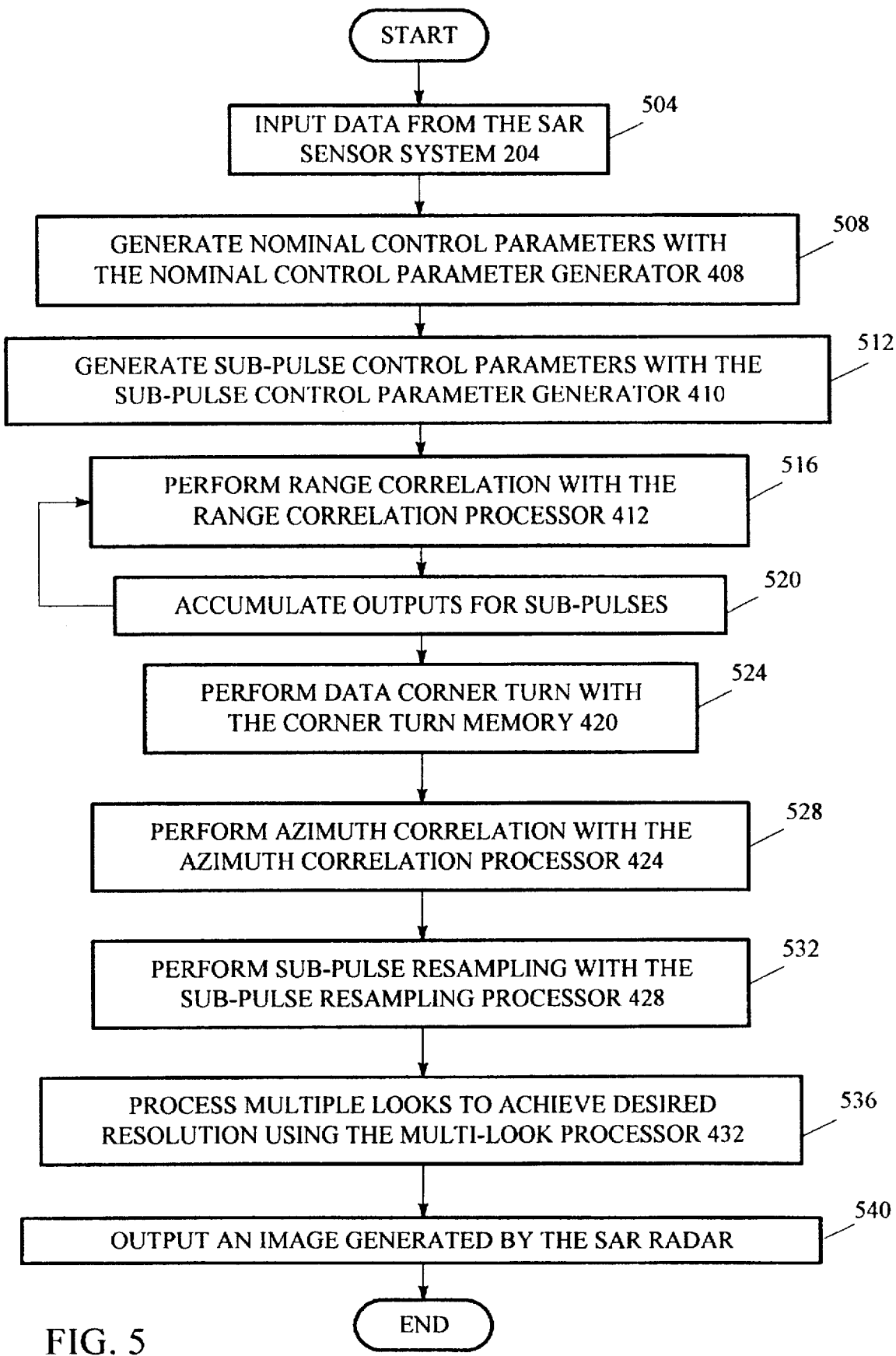
FIG. 5 is a flowchart of the SAR processor system 404, wherein this flowchart describes the steps performed in processing the SAR sensor system 204 data into, for example, images corresponding to the area from which reflected signals have been received.

FIG. 5 shows a flow diagram of the operation of the SAR processor system 404 for the present invention. The data received from the SAR sensor system 204 are used to generate control parameters for the pulse and sub-pulse signal data (steps 508 and 512). These parameters are used to control the range correlation process of step 516 which generates range compressed data that are accumulated and corrected through the process of step 520. The data are transformed using a corner turn process (step 524) and, in conjunction with the control parameters, processed through an azimuth correlation (step 528) to generate a two-dimensional data set which is compressed in both range and azimuth. Subsequently, the data output from the azimuth correlation step is provided to step 532 for resampling to remove artifacts introduced through use of the sub-pulse waveform, such as differences between the range and azimuth resolutions. In step 536, multiple data looks are processed to achieve the desired data resolution and image quality. Finally, in step 540, an image corresponding to the reflected signal distribution is output.

EXAMPLE

FREQUENCY-DIVISION WAVEFORM

Consider a sub-pulse radar system for the present invention that is designed to use linear FM (chirp) signals at multiple frequencies for implementing orthogonal sub-pulses. Assuming the SAR transmitter is designed such that the bandwidth of the transmitted chirp signal is a factor of N times that required to achieve the desired range resolution (for simplicity, let N be an integer), then if pulse compression is performed separately on each of the N sub-bands, the result is a set of N samples of the SAR azimuth waveform for each pulse.

To obtain image data derived from the two level signal sampling technique of the present invention, the frequency offsets of the sub-pulses must be removed. This can be done with conventional SAR pulse hardware, requiring only knowledge of the transmitted signal characteristics (i.e., such characteristics as frequency, phase and amplitude of the signals as a function of time). Further, such conventional signal pulse processing allows for the received signal to be frequency translated or demodulated using an appropriate oscillator frequency $f_m$ prior to on-board digitization and data storage, as one skilled in the art will understand. Accordingly, assuming that the starting phase of each sub-pulse is the same, the primary modification to the conventional pulse processing involves adjusting the range compression algorithm to cross correlate the received signal with replicas of each sub-pulse separately, as one skilled in the art will appreciate.

Note that this change is easily implemented since it requires only an adjustment of the center frequency and phase of the correlator reference function, as is discussed below.

For a pulse centered at $f=f_o$ with a large time-bandwidth product, the system impulse response is given as a function of time t for the $n^{th}$ pulse by [2]

$$g_n(t) = A_n \exp[j2\pi(f_0 - f_m)t]\exp\left[-j4\pi R_n \frac{f_0}{c}\right]\text{sinc}(u) \quad [2.1]$$

where $A_n$ is an overall complex amplitude, $R_n$ is the range to the body for the center of the $n^{th}$ pulse, c is the speed of light, $f_o$ is the center frequency of the transmitted signal, and $$u = K\tau_p(t - 2R_n/C) \quad [2.2]$$

with K the chirp rate and $\tau_p$ the pulse length. When a frequency offset $f_i = f_o + \delta f_i$ is included, this becomes $$g_{n,i}(t) = \quad [2.3]$$

$$A_n \exp[j2\pi(f_0 - f_m + \alpha_i f_0)t]\exp\left[-j4\pi R_n \frac{f_0}{c}(1+\alpha_i)\right]\text{sinc}(u)$$

where $\alpha_i = \delta f_i/f_o$, with $\delta f_i$ the frequency offset of the $i^{th}$ sub-band.

The processing modification involves adjusting the standard demodulation step to account for the frequency and phase offsets indicated in Equation [2.3]. This is performed through multiplication by the demodulation function $$D_i(t) = \exp[-j2\pi(f_o - f_m + \alpha_i f_o)t]$$

and the phase function $$Q_{n,i} = \exp\left[j4\pi R_n \frac{f_0}{c}\alpha_i\right]$$

where the value of $R_n$ corresponds to a fixed point in each resolution element.

As discussed by Harger in a previously cited reference, this frequency and phase adjustment is only exactly valid for the point within the resolution element corresponding to $R_n$. At other points within the resolution element, a residual phase error exists. For example, with a sub-pulse sequence which employs only two sub-pulses offset from each other by their bandwidth, the residual phase error is $\pm\pi$ at the edges of the resolution element if the adjustment is made at the center of the element. As a result of this pulse-to-pulse phase difference, the summation over pulses performed during azimuth correlation processing results in signal cancellation for signals reflected from objects not located at the center of the element. In the example described here, the cancellation is exact at the edge of the element (with lesser cancellation moving towards the element center). This coupling between the azimuth processing and range resolution does not occur in standard SAR processing. When worked out, the cancellation for an N sub-pulse format produces the exact range impulse response as a pulse with N times the bandwidth of each sub-pulse.

All of the quantities used in these steps are known during the pulse processing stage, so the frequency-dependent effects of the sub-pulse transmit format can be effectively eliminated. The result is the desired range-compressed signal $$\hat{g}_n(s) = A_0 \exp\left[-j4\pi R_n \frac{f_0}{c}\right]\text{sinc}(u)$$

which is similar to the functional format for standard pulse processing but with pulses occurring at N times the rate in normal pulse processing.

Signal Space Implementations

Figure 6:
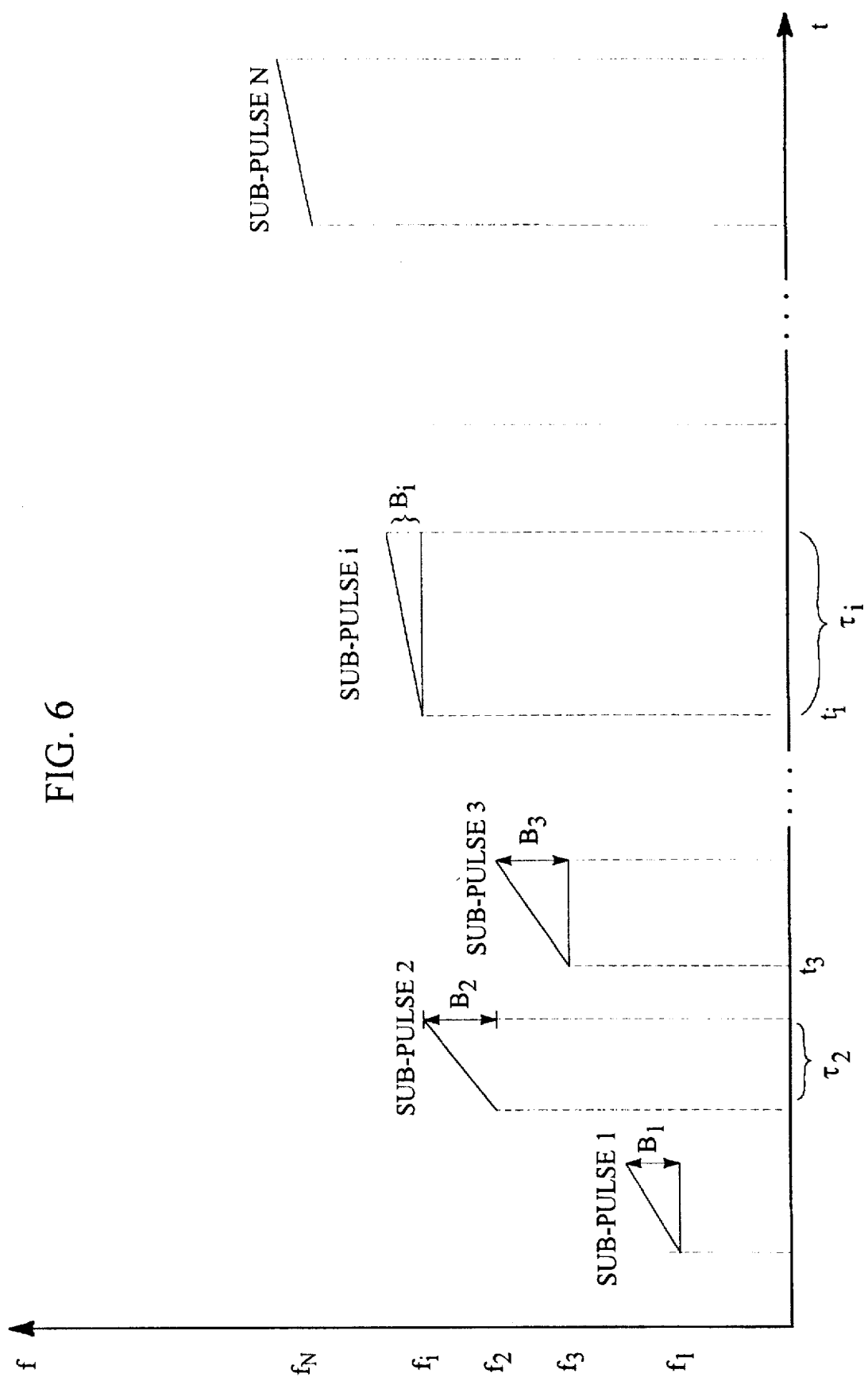
FIG. 6 presents a general representation of a pulse format for the present invention where the sub-pulses use a linear FM modulation. Each of the N sub-pulses have center frequency $f_i$, bandwidth $B_i$, duration $\tau_i$, and start time $t_i$.

The transmitted pulses in this example describing the modified PRF approach of the present invention can be implemented in any of several formats. FIG. 6 shows a general representation of one category of pulse format embodiments wherein the sub-pulses use a linear FM modulation as described in this example. Each of the N sub-pulses have center frequency $f_i$, bandwidth $B_i$, duration $\tau_i$, and start time $t_i$. A number of factors must be considered when selecting values for these parameters. The fundamental pulse length, given by $$\sum_{i=1}^{N} \tau_i,$$

and the fundamental PRF are determined, in part, by the desired relation between peak and average transmitted power as well as the capabilities of the transmitter hardware. The fundamental PRF must also satisfy the range ambiguity constraint give by Equation [1.1]. These ambiguity considerations are the same as those used in a standard radar without the modified PRF of the present invention.

Figure 7A:
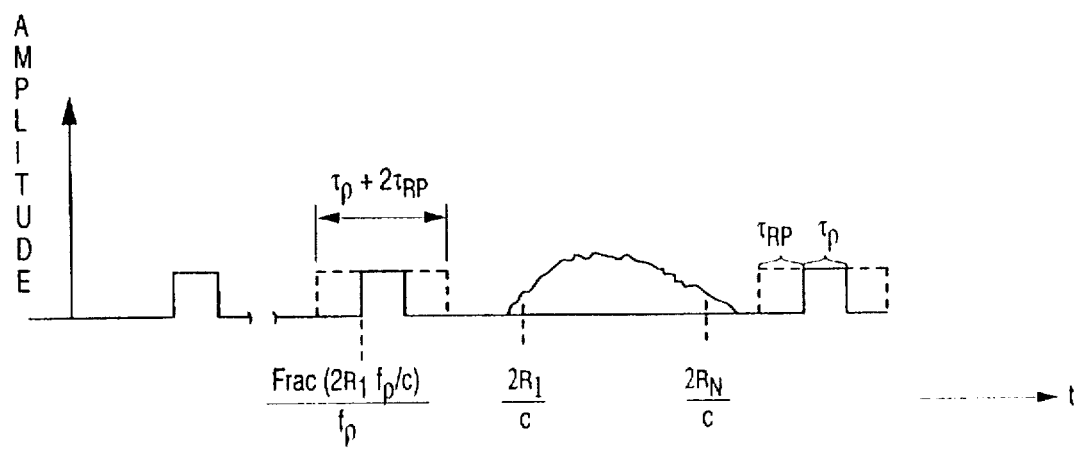
FIG. 7A presents a timing diagram illustrating the constraints on PRF selections from transmit interference.
Figure 7B:
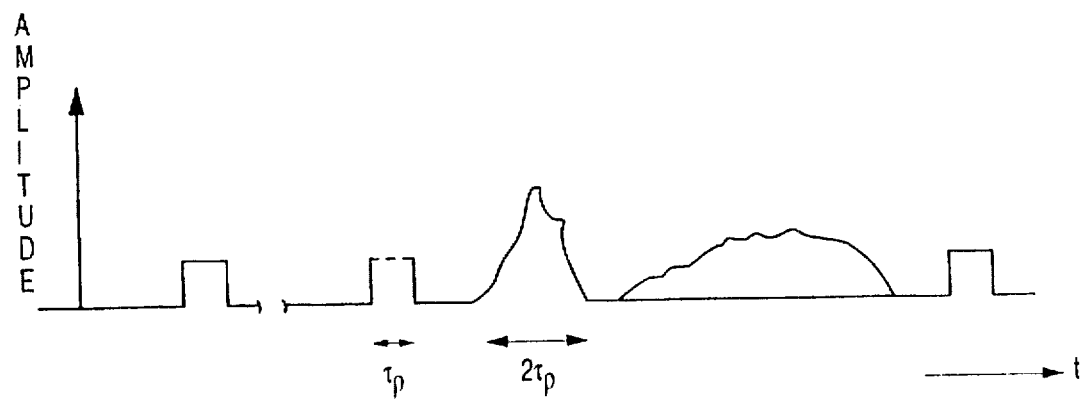
FIG. 7B presents a timing diagram illustrating the constraints on PRF selections from nadir interferences.

In addition, unless multiple receive channels are used, the pulse format must be selected so that the standard transmit window and nadir return reference constraints are met, as one skilled in the art will understand and as is described in the Curlander reference cited above. Additionally, note that these constraints are illustrated in FIGS. 7A and 7B. That is, the transmit window constraint shown in FIG. 7A can be described as follows: reflected pulses must arrive at the platform 10 during intervals that fall between transmit windows (the transmit window has length given by the sum of the pulse length $\tau_F$ and twice the pulse protect window $\tau_{RP}$). Accordingly, this constraint implies that each sub-pulse receive window should be located in a time period that is between the transmission windows of sub-pulses. Moreover, as shown in FIG. 7B, the nadir constraint implies that nadir pulse returns from preceding pulses do not occur within a current window for pulse reception. That is, FIG. 7B may be described as follows: reflected pulses must arrive at the platform during intervals that differ from intervals when nadir-reflected pulses arrive. However, unlike traditional radars, the nadir constraint condition must only be met for sub-pulses with the same frequency being received in a particular pulse reception window (as long as the nadir pulse return does not saturate the receiver front-end, as one skilled in the art will appreciate).

Figure 8C:
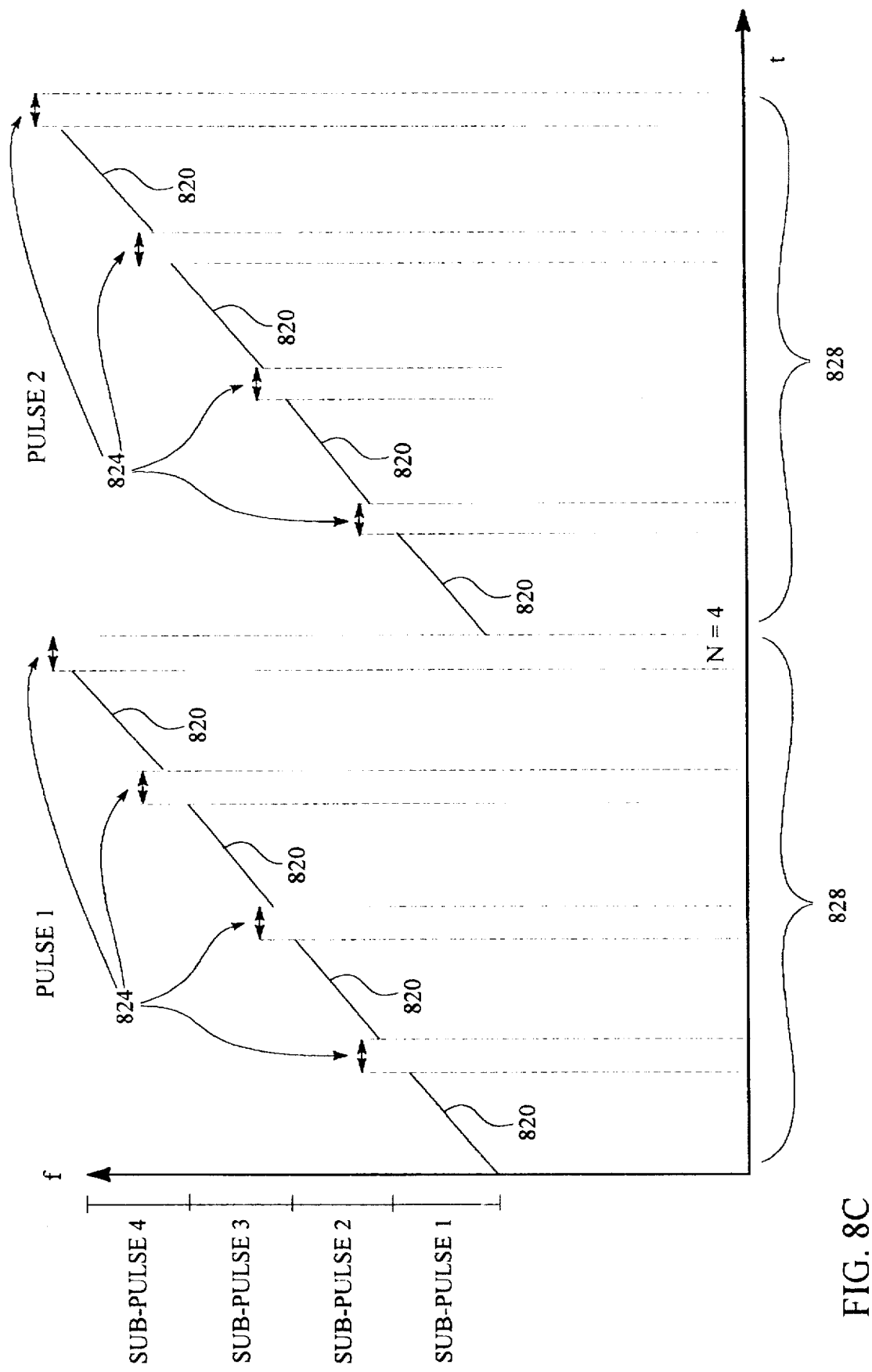
FIG. 8C presents an implementation of a linear FM sub-pulse format for the present invention wherein the sub-pulses are equally spaced through time.

Three particular representations of this pulse format may be implemented in typical radars. These are shown in FIGS. 8A, 8B and 8C. In FIG. 8A, a graph of chirp pulses 804 are shown wherein each chirp pulse has N (illustrated for N=4) sub-pulses that are contiguous in both frequency and time, as in a standard chirp pulse. This approach has the advantage of being fully consistent with existing chirp radars. Moreover, separation into sub-pulses may be implemented entirely in the image processor without any modification of radar hardware. The result is an interlaced sampling in which N sub-pulses are transmitted within the time period 808 defined substantially by the entire contiguous chirp pulse length and substantially no sub-pulses are transmitted during the long time gap 812 between pulses. However, such interlacing of sampling is particularly sensitive to noise in the sampled signal.

The pulse format representation of FIG. 8B is a modification of the first approach represented in FIG. 8A. However, the sub-pulses are separated in time as shown by the sub-pulse graphs 820 so that a non-transmit window 824 is provided for each sub-pulse. This pulse format reduces the sensitivity to noise. However, it also decreases the size of the maximum period between sub-pulses available for the receive data window in any pulse period.

The pulse format representation of FIG. 8C is a further modification of the format of FIG. 8B wherein the sub-pulses are spaced equally over the fundamental pulse period 828, wherein each sub-pulse is provided with a longer non-transmit window 824. This approach minimizes the sensitivity to noise in the sampled signal, but it also severely limits the maximum interpulse period available for the receive data window and thus the available swath width 46. However, these undesirable effects can be mitigated through system design trade-offs. In one embodiment, such undesirable effects may be mitigated by allocating some of the reduced antenna area to a width reduction, thus lowering the minimum fundamental PRF and increasing the potential data window. In an alternative embodiment, the undesirable effects may be mitigated by multiple data sub-windows, typically one for each sub-pulse. While this results in a striped image (i.e., ranges corresponding to the sub-pulse transmit periods between data sub-windows will have no data), the striping may be removed by combining images from multiple looks performed at slightly different PRF's, as one skilled in the art will appreciate.

Signal Power Considerations

The effect of the sub-pulse processing of the present invention on the transmit power required to achieve a given signal-to-noise performance depends on the invention embodiment. However, in general, the signal-to-noise performance for the present invention differs from the performance of standard signal processing algorithms as a result of four factors: 1) modification of the number of pulses integrated during range processing, 2) modification of the number of pulses integrated during azimuth processing, 3) modification of the antenna gain, and 4) modification of the resolution or the bandwidth.

For example, consider a radar system with a fixed bandwidth B, fixed peak power, and fixed pulse length wherein the system is modified to operate at a sub-pulse factor of N. For such a radar system, a reduction in antenna length by the factor N and an increase in signal-to-noise by a factor N can be obtained by absorbing a loss in resolution by the same factor. The reduction in antenna area decreases the two-way gain by a factor of $N^2$. Since the bandwidth is the same, the noise power is unchanged. The number of samples integrated in the range dimension is reduced by a factor of N, but is offset by the decrease in range resolution by the same factor. The number of samples integrated in the azimuth dimension is increased by a factor $N^2$, due to both the increased sample rate and the increased integration time (i.e., the increased azimuth beamwidth). The reduction in azimuth resolution introduces an additional factor of N. The gain loss of $N^2$ is thus offset by the azimuth integration gain of $N^3$, giving a total gain of N.

Note that if, instead, the bandwidth is increased by the sub-pulse factor N and the resolution remains fixed, the antenna length can be decreased by the factor N with a resulting signal-to-noise loss of N.

Further note that reducing the bandwidth of the noise-limiting passband does not provide any advantage in terms of signal-to-noise. While this does reduce the noise power, it also increases the correlation time of the noise signal by a factor N, so coherent integration gain is obtained only for sampling at a bandwidth less than B/N. As a result, the decrease in noise power is offset by the required decrease in range sampling rate.

EXAMPLE

As an example, consider a spaceborne SAR designed to produce 75 m resolution (slant range) images of the earth on a global basis from an altitude of 700 km. The radar operates at one of L, C-, or X-band (taken here to be 1.25, 5.3, and 9.6 GHz). In order to achieve large swaths as well as short repeat times between images, an incidence angle capability of 55° is desired. Using standard pulse processing, the ambiguity relationship implies minimum aperture areas of approximately 49.6 m$^2$, 11.6 m$^2$ and 6.4 m$^2$ for the three bands (these values will vary somewhat depending on the particular design). A typical configuration for such an antenna would be a length of 19 m and widths of 2.6 m, 0.6 m, and 0.3 m. Even at X-band, a physically large antenna is required to achieve this global imaging mission given standard pulse processing.

By incorporating sub-pulse processing of the present invention, considerably smaller antennas can be used to achieve the same performance. Using a bandwidth of 10 MHz and a sub-pulse bandwidth of 2 MHz (5 sub-pulses per fundamental pulse interval), the antenna area can be reduced by a factor of five. The antennas could be configured with lengths of 3.8 m and widths of 2.6 m, 0.6 m, and 0.3 m. Even at L-band, the antenna size (3.8 m by 2.6 m) is relatively manageable on a small spacecraft. The signal-to-noise of this system operating with 75 m resolution would be a factor of 7 dB better than the full 19 m antenna operating at 15 m resolution. For the same sensitivity, then, the transmit peak and average powers could be reduced by a factor of five.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for obtaining data about a body using pulsed signals reflected from the body in a range direction and in an azimuth direction, comprising:

transmitting, toward the body, a predetermined sequence of sub-pulses, said sub-pulses transmitted at a rate that is at least a first predetermined repetition frequency;

detecting, for each said sub-pulse, a corresponding sub-pulse reflection from the body;

storing a plurality of data items, wherein said plurality of data items includes, for each said sub-pulse reflection, a related data item derived from said sub-pulse reflection;

first sampling of said plurality of data items for obtaining a first series of data items;

wherein, there is a first sub-pulse sequence, included in said predetermined sequence of sub-pulses, such that each sub-pulse of said first sub-pulse sequence has a corresponding sub-pulse reflection for which there is a related data item of said first series, and wherein said first sub-pulse sequence has a repetition frequency at least that of the first predetermined repetition frequency;

second sampling of said plurality of data items for obtaining a second series of data items;

wherein, there is a second sub-pulse sequence included in said predetermined sequence of sub-pulses, such that each sub-pulse of said second sub-pulse sequence has a corresponding sub-pulse reflection for which there is a related data item of said second series, and wherein said second sub-pulse sequence has a repetition frequency less than said first predetermined repetition frequency;

providing one or more values related to said plurality of data items, wherein said one or more values have a reduction in sub-pulse reflection ambiguity;

wherein said step of providing includes the following substeps (A1) and (A2):

(A1) reducing, in the azimuth direction, an ambiguity in said one or more of values using said first sampling of said sub-pulse data items;

(A2) reducing, in the range direction, an ambiguity in said one or more of values using said second sampling of said data items;

using said one or more values having a reduced ambiguity for determining a characteristic of the body.

2. A method as claimed in claim 1, wherein said characteristic of the body is a radar cross section used to determine one or more of a position of an object, a soil moisture content, a vegetation type, a mineral type, a vegetation density, an ice/snow cover, a topographical characteristic, an ocean surface feature and an ocean subsurface feature.

3. A method as claimed in claim 1, wherein said first predetermined repetition frequency is substantially the same as the repetition frequency for said first sub-pulse sequence.

4. A method as claimed in claim 1, wherein said step of transmitting uses an antenna on a moving platform above the body for transmitting said predetermined sequence of sub-pulses.

5. A method as claimed in claim 4, wherein said repetition frequency for said second sub-pulse sequence is effective for reducing a range ambiguity.

6. A method as claimed in claim 4, wherein said repetition frequency for said second sub-pulse sequence is a function of at least one of: (a) a carrier frequency of said sub-pulse reflections, (b) an extent of the antenna substantially traverse to a direction of movement of the platform, (c) an altitude of the antenna above the body, and (d) an angle of incidence between a propagation direction of said predetermined sequence of sub-pulses and a tangent to a surface of the body at a point where the propagation direction and the tangent intersect.

7. A method as claimed in claim 4, wherein the body is a celestial body with the platform orbiting the celestial body.

8. A method as claimed in claim 4, wherein the antenna is a synthetic aperture radar antenna.

9. A method as claimed in claim 4, wherein said step of transmitting includes transmitting said sub-pulses from the antenna.

10. A method as claimed in claim 4, wherein said repetition frequency for said first sub-pulse is a function of: (a) a speed of the platform and (b) an extent of the antenna substantially parallel to a direction of movement of the platform.

11. A method as claimed in claim 1, wherein said repetition frequency for said first sub-pulse sequence is effective for reducing an azimuth ambiguity.

12. A method for obtaining data about a body from a moving platform using pulsed signals reflected from the body in a range direction and in an azimuth direction, comprising:

transmitting, toward the body, a sequence of sub-pulses from the platform wherein a consecutive plurality of said sub-pulses is transmitted within each pulse interval of a series of pulse intervals, so that the following conditions (A1), (A2) and (A3) are satisfied:

(A1) said sub-pulses are transmitted at a rate that is at least a first predetermined repetition frequency;

(A2) said pulse intervals repeat at a rate that is less than or equal to a second predetermined repetition frequency, said second predetermined repetition frequency being less than said first predetermined repetition frequency; and (A3) for each of said pulse intervals, a reflection from the body of at least one sub-pulse transmitted in the interval, wherein the reflection is distinguishable from every other body reflection of a sub-pulse from the pulse interval;

detecting, for each transmitted said sub-pulse, an associated reflection of the sub-pulse from the body;

storing a plurality of data items, wherein said plurality of data items includes, for each said associated reflection, a related data item derived from said associated reflection;

determining one or more values for a given characteristic of the body by:

(B1) using the related data item for each associated reflection of each sub-pulse of said sequence of sub-pulses to reduce azimuth ambiguity in said one or more values, and (B2) using said distinguishable reflections for reducing range ambiguity in said one or more values.

13. A method as claimed in claim 12, wherein each said distinguishable reflection includes one of a waveform and a signal frequency that uniquely identifies the distinguishable reflection from every other body reflection associated with a sub-pulse transmitted in a same interval as the sub-pulse with which the distinguishable reflection is associated.

14. A method as claimed in claim 12, wherein said range ambiguity is a function of a length of time during which an associated reflection for one of said sub-pulses is detected.

15. A method a claimed in claim 12, wherein said azimuth ambiguity is a function of a Doppler bandwidth shift in an associated reflection for one of said sub-pulses.

16. A method as claimed in claim 12, wherein at least one of the steps of transmitting and detecting utilizes an antenna on the platform.

17. A method as claimed in claim 12, wherein said step of transmitting includes transmitting said consecutive plurality of sub-pulses for a pulse interval as a chirp signal.

18. A method as claimed in claim 12, wherein said step of transmitting includes transmitting said consecutive plurality, N, of sub-pulses for a first pulse interval, such that one of the following holds:

(a) there is no time gap between said sub-pulses of said consecutive plurality of sub-pulses for said first pulse interval;

(b) there are time gaps between said sub-pulses of said consecutive plurality of sub-pulses for said first pulse interval;

(c) said consecutive plurality of sub-pulses for said first pulse interval are uniformly distributed in said first pulse interval.

19. A method for dimensioning an antenna for a moving platform, comprising:

establishing a length at least as long as each pulse interval of a sequence of pulse intervals, said sequence having an interval repetition frequency effective for reducing, along a direction substantially transverse to a movement of the platform, a likelihood of correlating a reflection from a body of a signal pulsed in one of said pulse intervals with a reflection from the body of a signal pulsed in a different one of said pulse intervals;

first determining a sequence of sub-pulse signals such that:

(a) said sequence of said sub-pulse signals can be transmitted within said length, (b) for each said sub-pulse signal of said sequence of sub-pulse signals having a corresponding reflection from the body, the corresponding reflection is distinguishable from every other reflection from the body of said sub-pulse signals in said sequence of sub-pulse signals; and (c) the sub-pulse signals of said sequence of sub-pulse signals have a sub-pulse repetition frequency effective for reducing an ambiguity in detecting said corresponding reflections, along a direction substantially parallel to a movement of the platform, wherein the ambiguity relates to a bandwidth aliasing of said corresponding reflections;

second determining an area for said antenna, said area being greater than or equal to a predetermined value, said predetermined value being inversely related to a predetermined number of sub-pulse signals within the sequence of sub-pulse signals.

20. A method as claimed in claim 19, further including a step of fabricating said antenna having dimensions that provide the area for said antenna.

21. A method as claimed in claim 19, wherein said step of first determining said plurality of sub-pulse signals includes establishing a uniquely identifying one of a frequency and waveform for each said sub-pulse signal in said sequence of sub-pulse signals.

22. A method as claimed in claim 19, wherein said step of second determining includes determining a dimension of said antenna in a direction substantially coincident with a direction of movement of the platform, wherein said dimension is inversely related to said sub-pulse repetition frequency.

23. A method as claimed in claim 19, wherein said step of establishing includes constraining said interval repetition frequency to be less than a function having a value determined substantially by the term:

$$fW \cos^2\theta / 2h\beta_w \sin\theta$$

where f is a carrier frequency for at least one said sub-pulse signal, W is said width of the antenna, h is an altitude of the antenna above the body, $\beta_w$ is a factor accounting for an angular broadening of said sub-pulse signals transmitted and $\theta$ is an incidence angle between the platform and the body.

24. A method as claimed in claim 19, wherein said step of first determining includes determining said sub-pulse repetition frequency to be greater than a function having a value determined substantially by the term:

$$2v\beta_L/L$$

where v is a speed of the platform, $\beta_L$ is a factor accounting for an angular broadening of a signal corresponding to one of said sub-pulse intervals, and L is a length of the antenna.

25. A method for reducing ambiguity in reflections of signals transmitted from a moving platform, comprising:

receiving a reflected signal in each interval of a predetermined series of intervals;

obtaining a data item related to each of said reflected signals;

providing interval and sub-pulse sampling frequencies, wherein each of said interval and sub-pulse sampling frequencies sample said data items at different frequencies;

first using said data items sampled at said interval sampling frequency for reducing reflected signal ambiguity in a direction traverse to a direction of movement of the platform;

second using said data items sampled at said sub-pulse sampling frequency for reducing ambiguity in said reflected signals along a direction coincident with the direction of movement of the platform.

26. A method as claimed in claim 25, wherein said platform includes a synthetic aperture radar antenna for receiving said reflected signals.

27. A method as claimed in claim 26, further including a step of transmitting signals from said synthetic aperture radar antenna, said signals providing said reflected signals when said signals are reflected from a body spaced apart from the platform.

28. An apparatus for imaging an area from a moving platform, comprising:

transmitter means, on the platform, for transmitting a plurality of pulsed signals toward the area;

first signal pulse controller means for determining a first sampling frequency for reducing range ambiguity of reflections of said pulsed signals wherein said range ambiguity is a function of an angle corresponding to signal propagation between the platform and the area in a direction traverse to a direction of movement of the platform;

second signal pulse controller means for determining a second sampling frequency for reducing a reflected signal azimuth ambiguity in a direction coincident with the direction of movement of the platform;

receiver means for receiving a reflection of one of said plurality of pulsed signals from the area in each interval of a predetermined series of intervals, said predetermined series having a repetition frequency of at least said second sampling frequency;

storage means for storing a data item corresponding to each of a majority of said reflections;

imaging means for determining a value for a location in the area, said value being a function of said data items;

wherein said imaging means samples said data items at a rate no greater than said first sampling frequency for reducing a distortion in said value resulting from data items with corresponding reflected signals having signal range ambiguity; and wherein said imaging means samples said data items at a rate of at least said second sampling frequency for reducing a distortion in said resulting from data items with corresponding reflective signals having azimuth ambiguity.

29. An apparatus as claimed in claim 28, wherein said second signal sampling frequency is at least twice said first signal sampling frequency.

30. An apparatus as claimed in claim 28, wherein said value is a function of said data items corresponding to said reflections that are reflected from the location.

31. An apparatus as claimed in claim 28, wherein said receiver means is on the platform.

32. An apparatus as claimed in claim 28, wherein said area is a swath on a surface of a celestial body orbited by the platform.

33. An apparatus as claimed in claim 28, further including a digitizing means for digitizing said reflections received by said receiver means for obtaining said corresponding data items.

34. An apparatus as claimed in claim 28, wherein said imaging means includes:

range correlation means for transforming said data items from a substantially greater than unity time-bandwidth product format to a format substantially being unity; and sampling segregation means for iteratively activating said range correlation means on said data items at said first sampling frequency.

35. An apparatus as claimed in claim 28, wherein said transmitter means and said antenna means are each included in a synthetic aperture radar system.

36. An apparatus as claimed in claim 28, wherein said value is included in a radar cross section used to determine one or more of a position of an object in the area, a soil moisture content of the area, a vegetation type of the area, a mineral type of the area, a vegetation density of the area, an ice/snow cover of the area, a topography of the area, an ocean surface feature of the area, and an ocean subsurface feature of the area.

* * * * *